UNITED STATES PATENT OFFICE.

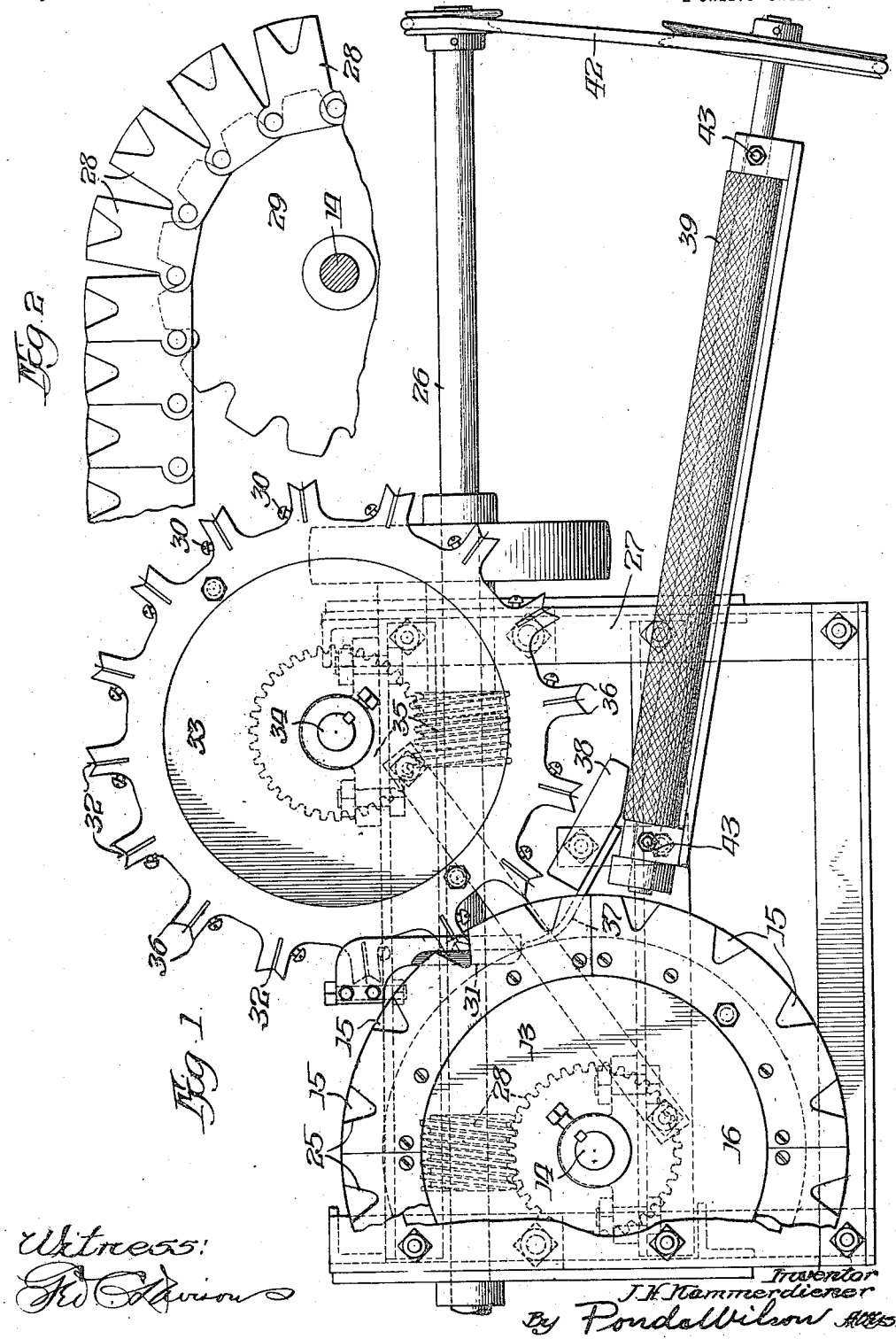

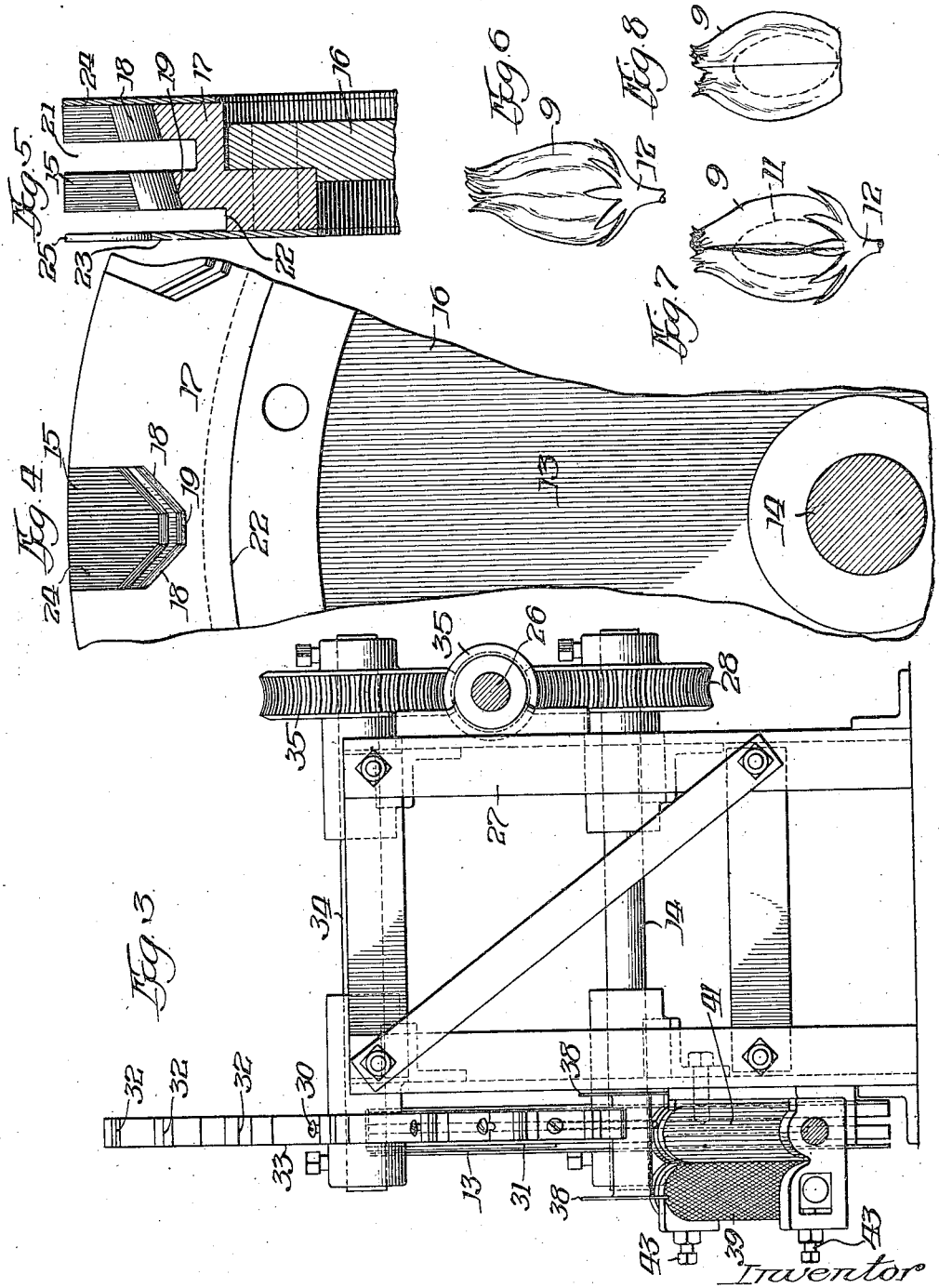

JOHN H. KAMMERDIENER, OF CHICAGO, ILLINOIS.

ROSELLE-PITTING MACHINE.

1,260,203.   Specification of Letters Patent.   Patented Mar. 19, 1918.

Application filed November 30, 1917. Serial No. 204,559.

*To all whom it may concern:*

Be it known that I, JOHN H. KAMMER-DIENER, a citizen of the United States, residing at Chicago, in the county of Cook and State of Illinois, have invented certain new and useful Improvements in Roselle-Pitting Machines, of which the following is a specification.

The roselle, a tropical plant, bears fruit, the calyces of which are utilizable for food. The calyx, of large, reddish, fleshy character, surrounds a seed pod, and when separated from the pod and stem is readily adapted to be made into jellies, jams, flavoring extracts and refreshing beverages. This invention relates to a machine for preliminarily preparing this fruit for food by removing the seed pods.

Because of the comparatively recent introduction of this fruit as a commercial product into this country, there has been, so far as I am aware, no means provided prior to my present invention for economically and expeditiously preparing the fruit for use in large quantities. I have aimed, therefore, to provide apparatus for accomplishing this end in a most efficient manner.

In furtherance of this general object, I have provided apparatus of novel design for separating the calyces, which are utilized for food, from the seed pods and stems. This result is accomplished in the present instance by a machine which carries single roselles successively into coöperative relation with devices by which the stem is removed, and the calyx is split longitudinally, whereupon the roselle is subjected to a device which removes or separates the calyx from the seed pod.

The operation and attendant advantages of my invention will be more fully understood by reference to the following description when considered in connection with the accompanying drawings, in which—

Figure 1 is a side elevation of apparatus embodying my improvements;

Fig. 2 is a fragmentary view of a modified form of carrier;

Fig. 3 is an end elevation of the apparatus shown in Fig. 1, looking at the right hand end thereof;

Fig. 4 is an enlarged side view of a portion of the carrier wheel shown in Fig. 1, with the retaining plate on the near side removed;

Fig. 5 is a cross-sectional view through one of the roselle-carrying pockets;

Fig. 6 is a representation of the fruit of the roselle, commonly termed "a roselle"; and Figs. 7 and 8 are illustrations, respectively, of the manner in which the roselle is split longitudinally and its stem removed.

Before entering into a description of the particular construction of the apparatus which I have shown in the present instance, as an illustration of a practical machine for carrying out the objects in mind, I will mention briefly the several operations desired to be performed. Each roselle is placed in a separate pocket in a carrier, which carries the pockets successively past a cutting device. The pockets in the carrier are constructed to carry each roselle in the same position, so that the cutting device will operate uniformly and similarly upon each fruit. It is desirable that the cutting apparatus shall split each calyx longitudinally to the pod and shall also cut the stem and surrounding sepals from the calyx and pod. Following this cutting operation the fruit is delivered to a device which separates the calyx from the seed pod. This separating device presents what might be termed a mouth, the sides of which are the upper peripheries of two adjacently disposed rollers which are revolved to turn inwardly and are provided with surfaces so shaped that in their engagement with the fruit they will draw and detach the soft fleshy calyx from the seed pods, the latter being sustained by and upon the rollers until delivered therefrom at one end thereof and the former being drawn downwardly between the rollers in a sort of pulpy mass.

Referring now to the drawings, Figs. 6 and 7 are representations of the roselle a little over one-half natural size, the calyx, seed pod and stem being indicated by reference characters 9, 11 and 12, respectively. The roselles are individually placed in a series of pockets in a carrier which is adapted to be moved to carry the pockets continuously, in succession, to the cutting apparatus. The carrier, designated generally by reference character 13, is of circular form, fixed to a shaft 14, and constructed to provide on its periphery a plurality of circumferentially spaced roselle-carrying pockets 15. The circular carrier shown is made up of a web 16, to the peripheral portion of which is secured an annular body 17 formed on its periphery with equally spaced transverse recesses or pockets designated by reference character 15. Each pocket, as shown clearly in Figs. 4 and 5, has downwardly converging sides 18, and a bottom 19 inclined downwardly toward one side of the carrier. A roselle may be positioned in a pocket with its thickest or butt end in the deepest end of the pocket, so that the major axis of the roselle is substantially parallel with the axis of rotation of the carrier. Thus, each pocket is specially shaped to accommodate a roselle and properly hold it in a predetermined position for the cutting operation. An annular groove 21 intersects the pockets intermediate their ends, as shown in Fig. 5, for a purpose mentioned hereinafter. Another annular cutaway 22 intersects the deepest end of the pockets. Side plates 23 and 24 define the ends of the pockets and the former plate has V-shape cutaways 25 opposite each pocket for the reception of the stems of the roselles.

Suitable driving means may be employed for continuously revolving the roselle-carrier in a clockwise direction, viewing Fig. 1, consisting in this instance of a drive shaft 26 journaled in bearings secured to a suitable frame 27 and connected with the roselle-carrier shaft 14 through the agency of the worm gear drive 28.

The roselles are placed by hand, or by suitable feed mechanism in the uppermost pockets of the carrier with the stems projecting through the pocket ends 25 and will be successively carried past a cutting station at which the stems are cut off and the calyces split longitudinally to the seed pods without removing the roselles from the pockets. In place of a roselle-carrier as shown in Fig. 1, an elongated endless carrier of another type might be employed if preferred. An example of such an elongated carrier is partially illustrated in Fig. 2. This figure shows a carrier of endless chain construction, the links 28 of which are adapted to mesh with a sprocket wheel 29 mounted on the shaft 14. Each link is shaped to provide a roselle-carrying pocket similar to the shape of those described with reference to the carrier 13. An endless carrier of this chain-like construction would obviously present more pockets at a time on the upper side, thus facilitating the matter of loading.

There are two cutting operations to be performed. One cuts the stem and surrounding sepals from the fruit and the other splits the calyx to the seed pod so as to facilitate the extraction of the pod. These cutting operations, performed substantially simultaneously, are effected in a very simple and practical manner by utilizing the continuous movement of the roselle-carrier so as to subject the roselles to the cutting devices in an effective manner. The stem-cutter is simply a knife blade 31 secured to the frame 27 and depending into the continuous passage afforded by the annular recess 22. The cutting edge, presented forwardly into the path of the roselles, extends below the roselle pockets as noted in Fig. 1, and will cut the stem and sepals from the fruit as the fruit is moved past the cutter. At the same time, the roselle will be firmly held against displacement in its pocket and will be cut longitudinally throughout its length substantially to the seed pod. The cutting means for splitting the roselles in this manner consists in the present instance, of a series of radially projecting cutter blades 32 carried in circumferentially spaced relation by a circular carrier 33 fixed to a shaft 34, in turn journaled on the frame 27, and driven from the drive shaft 26 by a worm gear connection 35. The cutter blades are removably and adjustably secured in position by set-screws 30 and are spaced apart equal to the distance between centers of the roselle-carrying pockets, and by relatively arranging the cutter and pocket-carriers in the manner shown and driving them simultaneously at the proper speeds the cutters will be successively moved into and out of the pockets for splitting the calyces as mentioned. At this cutting station wherein the paths of the cutters and pockets intersect, the roselle is engaged and slightly compressed by the projecting portions 36 of the cutter carrier contiguous to the cutters. Consequently, the roselles will be firmly held in the pockets during the cutting operations, thus insuring positive and accurate operation of both cutting devices.

Following the cutting operations which not only remove the stem parts but also prepare the fruit for extraction of the seed pod, the fruit is delivered to a device which separates the pods and calyces. The stems and sepals, it will be manifest, are simply carried downwardly and dropped below the carrier into any suitable receptacle. To insure proper delivery of the fruit from the carrier a finger guide 37 is provided. This finger, as will be noted from Fig. 1, is fixed to the frame and projects into the annular groove 21 in the roselle carrier, to a point beneath the bottom of the pocket therein so that each roselle having been cut as explained, will be carried onto the finger 37, and in moving along the inclined surface thereof will be forced out of the pocket and delivered by gravity onto the separating device which will be presently described. Guides 38 are provided, integral with the means for removing the roselles from the carrier, to properly guide the roselles into the mouth of the separating device.

I have found that a simple and effectual means for separating the seed pods and calyces consists of a pair of elongated rollers 39 and 41, respectively, mounted in close parallel relation on inclined axes in the manner shown in the drawings. The peripheral surface of one of the rollers 41 is fluted or ridged longitudinally so as to provide suitable gripping faces, and the peripheral surface of the opposite roller 39 is roughened or knurled. The roller 41 will be continuously driven in a counterclockwise direction, viewing Fig. 3, by suitable means such as a belt drive 42 from the drive shaft 26, and the roller 39 will, during the separating operation, be revolved in the opposite direction simply by the frictional engagement of the fruit as it is being operated upon by the driven roller member 41. The roller 39 may be adjusted toward and from the roller 41 through the agency of adjusting screws 43 so as to vary the proximity of the rollers to obtain the proper working relation thereof.

The roselles, after being subjected to the cutting operations and successively delivered from the carrier as described, will be guided to the mouth of the separating device, i. e., to the converging surfaces provided by the peripheries of the two rollers. The soft, fleshy calyces will be engaged by the surface of the roller 41, drawn into the mouth and passed between the rollers in a pulpy condition. It will be noted that inasmuch as the surfaces of the rollers are shaped so that their gripping capacity is quite limited, it will be possible for only the calyces to be engaged and passed between the rollers. The calyces when they reach the separating device are open at both ends and are split longitudinally, consequently, they are very susceptible to being separated and removed from the seed pods. As the fruit is being operated upon and tumbled by the rollers, it will gradually work itself toward the lower end of the rollers, and by the time the pods reach this lower end the calyces will have been fully separated therefrom so that the pods will simply fall or roll off the lower ends of the rollers. It will be understood, of course, that suitable hoppers, not shown, are provided for receiving the calyces from between the rollers and also for receiving the pods which drop off from the sides and bottom of the rollers. The calyces are then cooked and further prepared for food while the seed pods become refuse or by-products.

It will be noted that the operation of preparing roselles, which results in the complete separation of the calyces from the seed pods, stems and sepals, is continuous. That is, as long as roselles are supplied to the carrier they will be passed in continuous succession through the several operations, all of which occur in proper sequence in a manner to obtain the desired ends in a most simple and advantageous manner. The devices employed for performing the several operations are exceedingly simple and are compactly arranged, thus promoting efficiency.

It is believed that the foregoing conveys a clear understanding of the objects prefaced above, and it should be understood that while I have illustrated and described one working embodiment of my improvements various changes and modifications might be resorted to without departing from the spirit and scope of the invention as expressed in the appended claims.

I claim:

1. In an apparatus of the character described, the combination of a roselle carrier, means for separating the stems from the roselle bodies and for splitting the roselle calyces while disposed on said carrier, and means for separating the split calyces from the seed pods.

2. In an apparatus of the character described, the combination of means for separating the stems from the roselle calyces and splitting said calyces, and means for separating the split calyces from the seed pods contained therein.

3. Apparatus of the character described, comprising means for carrying roselles in predetermined order to a cutting station, means for cutting the calyces to facilitate the removal thereof from the seed pods, means for removing the stem and sepals from the roselle, a separating device, and means for delivering the roselles from the carrier to the separating device, the separating device being constructed to separate the calyces from the seed pods and deliver the same separately.

4. Apparatus for preparing roselles consisting of a carrier having a series of roselle-carrying pockets adapted to carry roselles successively past operating mechanism, a cutting device for cutting the calyces of roselles to facilitate separation from the seed pods, and a separating device for separating the calyces from the seed pods.

5. Apparatus of the character described, comprising a series of pockets each adapted to carry a roselle, means for moving the pockets successively to a cutting station, means for splitting the calyx of each roselle at said station, means for delivering the roselles from their respective pockets after the splitting operation, and means for separating the calyces from the seed pods.

6. An apparatus of the character described comprising means for acting upon a roselle to remove the stem and partially open the calyx, and means for removing the seed pod from said partially opened calyx.

7. Apparatus for preparing roselles, comprising a carrier, means for splitting the calyces, of roselles disposed on said carrier, rotary separating elements arranged in close relation so that their upper surfaces move downwardly toward each other, and means for delivering the split roselles from said carrier to the separating elements so that the calyces will be engaged by the surfaces of said elements and drawn therebetween so as to become separated from the seed pods.

8. Apparatus for preparing roselles comprising a carrier having a series of roselle-carrying pockets intersected by a cutter opening, means for moving the carrier to move the pockets successively past a cutting station, a cutter at said station adapted to enter the cutter opening of each roselle-carrying pocket for cutting the stem from the roselle, means for splitting the calyces, and means for removing the calyces from the seed pods.

9. Apparatus of the character described, comprising a carrier having a plurality of spaced roselle-carrying pockets, a rotary cutter-carrier equipped on its periphery with a plurality of circumferentially spaced cutters adapted to successively register with and enter said pockets upon rotation of the cutter carrier, means for moving the pocket carrier and cutter carrier in timed relation so that the cutters will successively enter said pockets, the cutters being adapted to split the calyces of the roselles disposed in the pockets, and means for separating the calyces from the seed pods subsequently to said splitting operation.

10. Apparatus of the character described, comprising a carrier having a plurality of spaced roselle-carrying pockets, a rotary cutter carrier equipped on its periphery with a plurality of circumferentially spaced cutters adapted to successively register with and enter said pockets upon rotation of the cutter carrier, and means for moving the pocket carrier and cutter carrier in timed relation so that the cutters will successively enter said pockets, the cutters being constructed to split the calyces longitudinally substantially to the seed pods so as to facilitate the subsequent removal of the calyces from the seed pods.

11. The combination of a carrier, provided with a series of roselle-carrying pockets constructed so that the roselles will be positioned in the pockets with the major axes of the roselles disposed transverse to the direction of travel, means in the path of the roselles for cutting the stems therefrom, cutter means adapted to be successively moved into the pockets for splitting the calyces, means for separating the calyces from the seed pods, and means for delivering the roselles from the pockets to the separating means.

12. The combination of a carrier having a series of roselle-carrying pockets adapted to be moved successively to a cutting station, means for cutting the stem from a roselle and splitting the calyx thereof substantially to the seed pod while the roselle is held in its pocket, means for removing the roselles from the pockets subsequent to the cutting operations, and rotary elements adapted to receive the roselles from said carrying means and separate the calyces from the seed pods.

13. In an apparatus of the character described, the combination of a roselle carrier, means for operating upon roselles upon said carrier to remove the stems and partially open the calyces, and means for subsequently removing the seed pods from said partially opened calyces.

14. In an apparatus of the character described, the combination of a roselle carrier, a stationary device for removing the stems from the successive roselles presented by said carrier, means for partially opening the calyces of the roselles on said carrier, means for removing the roselles from the carrier, and means for removing the seed pods from said partially opened calyces.

JOHN H. KAMMERDIENER.

Copies of this patent may be obtained for five cents each, by addressing the "Commissioner of Patents, Washington, D. C."